3,326,706
MICROPOROUS CHALK MORTAR COMPOSITION
François Xavier Deloye, Ris-Orangis, France, assignor to Société Industrielle des Matériaux Blancs SIMAB, Paris, France, a corporation of France
No Drawing. Filed Dec. 8, 1964, Ser. No. 416,922
Claims priority, application France, Feb. 21, 1962, 888,778, Patent 1,327,749
5 Claims. (Cl. 106—97)

This application is a continuation-in-part of the U.S.A. patent application Ser. No. 258,130, filed on Feb. 13, 1963, by the same applicant and now abandoned.

The present invention relates to a mortar composition consisting essentially of a chalk having a porosity exceeding 50% and preferably 60%, in a range of pore radii of from 1 micron ($1\mu$) to 10 centimicrons ($10\ c\mu$) and having a purity degree higher than 95%, said chalk which will be denoted hereinafter as a "microporous and pure chalk," being finely crushed and bound by means of Portland cement.

The applicant has found that such a mortar composition provides, without any curing or burning, building elements presenting excellent mechanical and insulating properties and having a fine white colour.

The applicant has attempted to provide a theoretical explanation of this unexpected result. These theoretical explanations, together with a method of manufacture of chalk conglomerates according to the so-called "microporous" chalk of this invention, will be best understood from the following description, with reference to a nonrestricted practical example of said method.

In this example the starting material is a micrasterias chalk extracted from a quarry of the lower Senonian, this quarry being located in France, at Mézières-en-Vexin, in the Eure Department, the chemical analysis of which has yielded the following approximate composition:

| | Percent by weight |
|---|---|
| $SiO_2$ | 0.7 |
| $Al_2O_3$ | 0.4 |
| $Fe_2O_3$ | 0.09 |
| $TiO_2$ | 0.2 |
| CaO | 54 to 55 |
| MgO | 0.3 |
| $SO_3$ | 0.09 |
| $Na_2O$ | 0.05 |
| $K_2O$ | 0.1 |
| Insoluble products (and particularly uncombined silica) | 0.9 |
| Burning loss (substantially $CO_2$) | 43.5 |

The globigerina which essentially constitutes the so-called "micrasterias chalk" is a fossil of the Senonian, the shell of which, visible under the microscope, is highly ramified.

It follows that a micrasterias chalk has an overall volume porosity of the order of 44%, for instance, for the type as defined hereinabove, a particularly important percentage of which is located in the range corresponding to extremely small pore radii comprised between $1\ c\mu$ and $1\mu$, in the example considered.

By way of example a porosimetric investigation of the chalk as defined hereinabove has enabled to determine the following distribution:

| Pore radius, $\phi$ | Volume of the pores, in percent of the overall volume | Porosity distribution, percent |
|---|---|---|
| 0 to $1\ c\mu$ | 0 | 0 |
| $1\ c\mu$ to $10\ c\mu$ | 1.76 | 4 |
| $10\ c\mu$ to $1\mu$ | 30.0 | 68 |
| $1\mu$ to $10\mu$ | 0 | 0 |
| $10\mu$ to $100\mu$ | 8.7 | 20 |
| More than $100\mu$ | 3.1 | 8 |
| Total | 43.5 | 100 |

It is noted that this porosity is clearly distributed over a first range of above $50\mu$ and over a second range of between $1\ c\mu$ and $1\mu$, the latter probably corresponding to the porosity proper of the globigerina shells, the first range corresponding to the intervals separating said shells.

The apparent density of this chalk is equal to 1.520 which, taking into account the porosity, corresponds to a specific mass of 2.7 grams/$cm.^3$, which is the specific mass of the calcite.

In a specific example the mortar has been obtained according to the following procedure:

*Example*

The micrasterias chalk as defined hereinabove, is comminuted in a crusher of known type (e.g. a hammer, a rotary cage or a ball crusher), so as to obtain the following grain sizes:

70% standing over a screen with an equivalent diameter of 100 microns

53% standing over a screen with an equivalent diameter of 200 microns

36% standing over a screen with an equivalent diameter of 315 microns

The elements (30%) passing through a screen with an equivalent diameter of 100 microns give the following oversizes:

Over a screen with an equivalent diameter of (microns)—

43:4.3 percent  
35:13.4 percent  
27:30 percent  
19:39 percent  
11:44 percent  
7.6:48 percent  
4.3:52 percent This comparatively rough crushing which has no other effect than to strip off the micelles formed by the globigerina shells, provides, owing to the very fine porosity of this chalk, a specific surface of the order of 4800 $cm.^2$/gram, as measured on the Blaine instrument.

It is to be emphasized that the micrasterias chalk, which is a "microporous chalk" as defined herein above has, even in the raw state as extracted from the quarry, a specific surface which is definitely higher than that of any type of non-microporous chalk.

Tests have been carried out by the applicant through the B.E.T. method.

This method, which is disclosed at length in the "Journ. Amer. Chem. Society, vol. 60, p. 309, 1938": Absorption of gases in multimolecular layers, by Stephen Brunscier, P. H. Emmet and Edward Teller, essentially consists in measuring the quantity of nitrogen, taken in the liquid state, which the test sample is capable of absorbing. The B.E.T. method, contrary to the Blaine method, provides a measurement of the specific surface, account being taken of the internal surface of all the open micropores and, therefore, it particularly emphasizes the difference between a "microporous" and a "non-microporous" chalk. For the microporous chalk of the above example, taken in the raw state, the specific surface as measured with the B.E.T. method, equals 29,000 cm.$^2$/gram. The figure is considerably smaller for a non-microporous chalk extracted from a quarry at Ivry-la-Bataille in the Eure Department, France. In said non-microporous chalk the volume of the pores, expressed in percent of the overall volume, was 40% and 40% of said porosity was distributed within a range of pore radii of lower than 1 micron.

As will be discussed hereinafter, this difference in the porosities of a microporous and any non-microporous chalk is definitely critical as regards the process according to the invention.

It is emphasized that the crushing operation will not increase the specific surface of the non-microporous chalk in such proportions that it can reach or even can get near the critical level which is necessary for obtaining practically utilisable building blocks.

Referring more particularly now to the example, one metric ton of the "micrasterias" pure microporous chalk, roughly crushed as indicated above, has been mixed with 120 to 130 kgs. of Portland cement HRI, consisting exclusively of 95% clinker and 5% gypsum (without slags, ashes or chloride) the specific surface of this cement (measured on the Blaine instrument, was on the average of 3200 cm.$^2$/gram) and a quantity of water was added in an amount necessary to obtain a more or less plastic mortar according to the type of shaping (manual casting, vibrating table or compression type vribrating machine). A block shaped through vibration had a compression strength, as measured after an interval of 90 days equal to 200 kgs./cm.$^2$. Its apparent density was 1.65, its thermal insulating coefficient is 0.56. It was completely impervious; it did not freeze and possessed a high dimensional stability.

These results are extremely surprising if one considers, on the one hand, that the micrasterias chalk, as any other type of chalk, presents substantially no proper mechanical strength (and is thus entirely unfit to form a concrete aggregate), and, on the other hand, that the cement content is too small to account for the mechanical strength of the conglomerate.

Comparative tests, carried out by the applicant, have shown that the compression strength of a conglomerate manufactured by the same process as disclosed in the present example, and with the same cement proportions, starting in a first test, from the non-microporous chalk from Ivry-la-Batille and, in a second test, from sand, is substantially of the same order of magnitude in both tests and is definitely too low for practical use as a building element.

This distinctly shows that a non-microporous chalk will be completely unfit for manufacturing building blocks, and that the difference in the results is drastic, according as the chalk is microporous or not.

The theory according to which the finest particles of the calcite micro-crystals which form the microporous chalk are merely dissolved, this dissolution being followed by a recrystallisation capable of forming bridges between the cement grains, must be dismissed tests with lime and soda used as a binder, instead of cement, did not, indeed, give any satisfactory results.

The applicant has found that the Portland cement not only plays the role of a mechanical binder of the calcite crystals forming the chalk, but further participates in a physico-chemical way in the consolidation of the mortar chalk through an epitaxy—more precisely by the epitaxical pseudomorphic growth of portlandite crystals on the calcite.

The portlandite, which is a crystallised calcium hydroxide $Ca(OH)_2$, is, as well known, one of the hydrated constituents of cement. According to the applicant's theory there is a mutual diffusion during the epitaxy between the OH ions of the portlandite and the $CO_2$ ions of the calcite. The result is the generation of a cohering layer with a thickness of some tenths of a micron, formed by a mixed crystal of calcite and portlandite.

The mixed crystals thus formed are stronger than the calcite or portlandite crystals individually and this accounts for the surprising strength of the conglomerate obtained with the mortar composition according to this invention.

In practice, no substantial and practically useful or even discernible development of the epitaxy will be obtained, unless a microporous chalk is used.

This may be explained as follows: in a microporous chalk the average radius of the micropores, account being taken of the value of the volumetric porosity of this microporous chalk and of the thickness of the calcite partitions which separate the micropores, is substantially of the same magnitude as the maximum penetration depth of the mutual diffusion of the OH and $CO_2$ ions. The result therefrom is that nearly the whole of the mass of the mortar according to the invention will be transformed into mixed crystals. However, no substantial growth of mixed crystals will take place in a mortar containing a non-microporous chalk.

It is to be emphasized that the transformation of the mortar into mixed crystals is irreversible and, therefore, the setting of the mortar also is irreversible, the product maintaining unrestrictedly its properties, which is a remarkable feature of this invention.

It has been stated hereinabove that the microporous chalk should have a purity degree of higher than 95%. The applicant has found that the epitaxy will not be obtained at all if the chalk should have a lower degree of purity. This most probably is due to the fact that the epitaxy definitely requires a previous fresh cleaning of the calcite crystals by dissolution. A dissolution of this kind is only possible if the proportion of impurities in the chalk is quite small, whence the drastically critical necessity of using a chalk having the purity degree as defined. The pure microporous chalk, as defined, mixed with finely crushed artificial cement (HRI type, for instance) and with an important quantity of water, will be cleaned by the water that is added for the mixing. The thickness of the microcrystalline calcite partitions thus exposed will then be reduced to some tenths of a micron, and in the course of hardening, the mutual migrations will progressively replace most of the calcite and portlandite crystals by mixed crystals.

It is observed that the raw chalk as extracted from the quarry, need not have a purity degree of at least 95%; it is sufficient that this chalk is such, that it reaches the purity degree of 95% by means of comparatively simple mechanical procedures for the elimination of silex, for instance. However, should the chalk contain impurities visible under the microscope, these would mostly settle in the pores and consequently would hinder the above-mentioned fresh cleaning.

These considerations clearly explain why any chalk which is not within the scope of the above definitions of a "microporous chalk" will definitely not facilitate (on the contrary, far from that) the task to obtain building blocks having a compressive strength sufficient for practical use.

It is furthermore observed that the conglomerate with the microporous chalk obtained, has an exceptional whiteness which increases as the drying proceeds.

This is the more remarkable as this result is obtained with a grey-coloured cement. It can be explained by the light-diffusing power of the micrasterias chalk, connected with the structure thereof.

It should be noted that this white outlook was obtained with a slagless and ashless cement: the only coloured component o fthe cement used is the tetracalcic ferro-aluminate in a proportion, by weight, of less than 10% in the cement.

In this finished conglomerate there ultimately exists less than 1% of a coloured substance embedded in a mass of highly developed diffusing power: the colouring of the conglomerate imparted by this substance, even when hydrated, is undiscernible.

Should the cement used contain some ashes, or slags, or even a more important proportion of tetracalcic ferro aluminate (12 to 13%, as is the case for certain cements), then the final product will lose its bright whiteness. In the case of a high slag content, besides the colouring there may also occur some haloes.

It is to be understood that the example given above is by no means limitative: the specific surface of the chalk may be somewhat varied (by means of a convenient crushing), as well as by varying the cement proportions, within the limits which are given hereinbelow, in view of obtaining a product having the prevailing features desired (such as phonic and thermal insulation, mechanical resistance and tightness) without departing from the scope and spirit of this invention.

When it is desired to obtain building elements of good strength, a proportion of Portland cement of between 10 and 20 parts will preferably be used for 100 parts (by weight) of chalk. When it is desired to obtain a material of comparatively low strength, when it has to be used, for instance, as a plaster or wash for walls or ceilings or even, in some cases, as building elements, a proportion of Portland cement of between 5 and 10 parts by weight for 100 parts of chalk is preferably to be used.

The compressive strength of the material, measured under the conditions as specified hereinabove, is 200 kgs./cm.$^2$ for a cement proportion of between 12–13 parts. The strength will decrease to 60–80 kgs./cm.$^2$ for a composition containing only 8–10 parts of Portland cement, and to 15–20 kgs./cm.$^2$ for a composition containing only 5 parts of Portland cement.

Below 5 parts by weight of Portland cement the strength of the resulting material is too low for practical use of any kind.

Of course, the pure "microporous chalk" need not have the composition as indicated in the example, or need not be a "micrasterias chalk," provided its porosity and purity degree are as defined.

The term "Portland cement," as used in the present specification and in the annexed claims, has no restrictive meaning and covers any cement containing more than 70% clinker. In practice, the standard grade Portland cements have a specific surface—as measured on the Blaine instrument—which substantially exceeds 3000 cm.$^2$. As the hydration of the cement starts from the surface of the cement grains and, in practice, is never total, the larger the specific surface of the cement used is, the larger is the quantity of lime frost resulting from the cement hydration and the larger is the quantity of portlandite produced during the hardening thereof. However, in definite contradiction to what happens for the specific surface of the chalk, there is no critical level for the specific surface of the cement which is to be used in the composition.

What is claimed is:

1. A composition consisting essentially of a mixture of 5–20 parts by weight of Portland cement, 100 parts of comminuted chalk, said chalk having a porosity by volume, at least 50% of which is distributed within a range of pore radii comprised between 1 micron and 10 centimicrons, with a purity degree of at least 95%, and of sufficient water to give a composition of the consistance required in accordance with the purpose for which the composition is to be used.

2. A composition for use as a building material, consisting esentially of 10–20 parts by weight of Portland cement, 100 parts of comminuted chalk, said chalk having a porosity by volume, at least 60% of which is distributed within a range of pore radii comprised between 1 micron and 10 centimicrons and has a purity degree of at least 95%, and with sufficient water to give a composition of the consistency required in accordance with the purpose for which the composition is to be used.

3. A composition for use as a building material, consisting essentially of 10–20 parts by weight of Portland cement, 100 parts of comminuted chalk, said chalk being a micrasterias chalk having a porosity by volume, at least 60% of which is distributed within a range of pore radii comprised between 1 micron and 10 centimicrons, with a purity degree of at least 95%, and with sufficient water to give a composition of the consistency required in accordance with the purpose for which the composition is to be used.

4. A composition for manufacturing white building blocks, consisting essentially of 12–13 parts by weight of Portland cement, said Portland cement being a slagless and ashless Portland cement containing a proportion of less than 10% by weight of tetracalcic ferro-aluminate, 100 parts of comminuted chalk, said chalk having a porosity by volume, at least 60% of which is distributed within a range of pore radii comprised between 1 micron and 10 centimicrons, with a purity degree of at least 95%, and with sufficient water to give a composition of the consistency required in accordance with the purpose for which the composition is to be used.

5. A composition for manufacturing building blocks, consisting esentially of 10–20 parts by weight of Portland cement, 100 parts of comminuted chalk, said chalk having a porosity by volume, at least 60% of which is distributed within a range of pore radii comprised between 1 micron and 10 centimicrons and with a purity degree of at least 95%, the specific area of the comminuted chalk being of the order of 4800 cm.$^2$/gram, and with sufficient water to give a composition of the consistency required in accordance with the purpose for which the composition is to be used.

References Cited

FOREIGN PATENTS 536,657 2/1957 Canada.
639,460 4/1962 Canada.
511,481 8/1939 Great Britain.

OTHER REFERENCES

Lea and Desch: The Chemistry of Cement and Concrete, Edward Arnold Ltd., London 1956, 2nd edition, pp. 22, 248, 249.

TOBIAS E. LEVOW, *Primary Examiner.*

S. E. MOTT, *Assistant Examiner.*